F. L. DORSK.

TOY.

APPLICATION FILED SEPT. 29, 1920.

Reissued Nov. 30, 1920. 14,995.

Inventor

Frank L. Dorsk.

By Robert Watson

Attorney

UNITED STATES PATENT OFFICE.

FRANK L. DORSK, OF BALTIMORE, MARYLAND, ASSIGNOR TO MARYLAND TOY MANUFACTURING COMPANY, INC., A CORPORATION OF MARYLAND.

TOY.

14,995. Specification of Reissued Letters Patent. Reissued Nov. 30, 1920.

Original No. 1,342,945, dated June 8, 1920, Serial No. 352,726, filed January 20, 1920. Application for reissue filed September 29, 1920. Serial No. 413,630.

*To all whom it may concern:*

Be it known that I, FRANK L. DORSK, a citizen of the United States, residing at Baltimore, in the State of Maryland, have invented certain new and useful Improvements in Toys, of which the following is a specification.

This invention relates to improvements in toys, and has for its object to provide a simple, cheap and attractive toy for the amusement of children, and further to so construct said toy that the parts thereof can be folded to save space and to prevent breakage in shipment.

The invention consists of the novel construction and arrangement of the parts hereinafter more fully set forth in the following specification and pointed out in detail in the appended claims.

Figure 1:
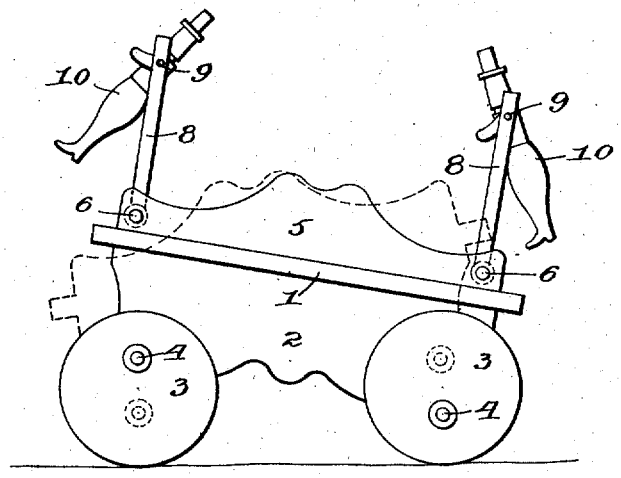
Figure 1 is a side elevation of my invention, showing one end of the base raised in the position it assumes as the toy is drawn along the ground.
Figure 2:
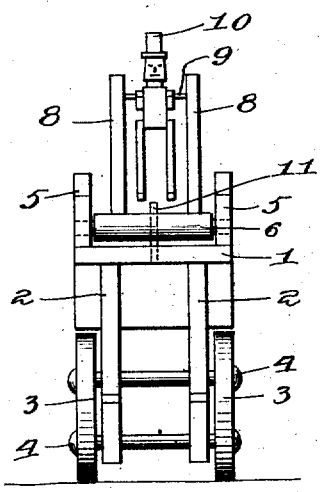
Fig. 2 is an end view of Fig. 1.
Figure 3:
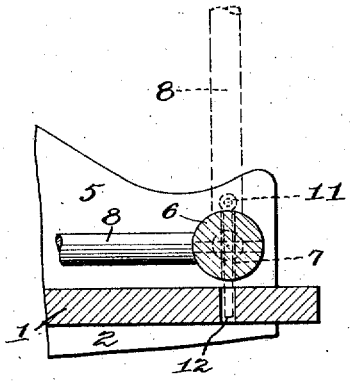
Fig. 3 is an enlarged detail view showing one of the parallel bars folded down upon the base.

Referring to the accompanying drawings forming part of this specification, and in which like reference numerals designate like parts throughout the several views thereof, 1 designates a base having sides 2 projecting from the under surface thereof in which supporting wheels 3 are mounted. The said wheels 3 are mounted upon the axles 4, off their centers, as seen in Fig. 1, so that when the toy is drawn along the ground a rocking motion will be imparted to the base 1 and cause the figures mounted thereon to swing and revolve. The said base 1 is provided with two side pieces 5, projecting from its upper surface, and in each end of the said pieces 5 is revolubly mounted a shaft 6, having an aperture 7 therethrough and two parallel bars 8 projecting therefrom. Extending across the upper ends of the parallel bars 8 is a horizontal bar 9, from each of which latter is hung a figure 10 adapted to swing and revolve on said horizontal bars 9. In order to use the toy the parallel bars must be held in the upright position, and I provide suitable means for locking the bars in this position. As the parallel bars are carried by the shafts 6, I preferably apply the locking means directly to the shafts. As shown in the drawing, each of the said shafts 6 is provided with a pin 11 adapted to pass through aperture 7 and into the aperture 12 in the base 1 when the parallel bars 8 are in the upright position.

When the toy is to be shipped the pin 11 is withdrawn from the aperture 12 in the base 1 so that the parallel bars 8 can be folded down with the figure 10 resting upon the base 1 between the sides 5 to prevent breakage of the said parallel bars or figures, in shipment.

Having thus described my invention, what I claim is:

1. A toy comprising a base and supporting wheels adapted to cause rocking movements of the base when the toy is in use, sides projecting above the base, shafts revolubly mounted between said sides at the ends thereof, parallel bars projecting from each shaft and figures revolubly hung between the bars, said bars and figures adapted to fold between the sides.

2. A toy comprising a base and supporting wheels adapted to cause rocking movements of the base when the toy is in use, sides projecting above the base, parallel bars pivotally mounted at the ends of the base and adapted to fold between the sides, figures revolubly hung between said parallel bars, and means for locking said bars in their unfolded positions.

3. A toy comprising a base and supporting wheels adapted to cause rocking movements of the base when the toy is in use, sides projecting above the base, shafts revolubly mounted at the ends of the sides, parallel bars projecting from each of said shafts, locking means for holding said parallel bars in the upright position, said bars adapted, when unlocked, to fold between said sides, and figures revolubly hung from said bars and adapted to fold, with the bars, between said sides.

4. A toy comprising a base having an aperture in each end, wheels upon which said base is mounted, said wheels being mounted off their centers, sides projecting above said base, a shaft revolubly mounted in said sides at each end of said base and having an aperture therethrough, a pin adapted to pass through the aperture in each of said shafts and into the aperture in the base, parallel bars projecting from each of said shafts, and a figure revolubly hung from each of said parallel bars.

5. A toy comprising a base having an aperture in each end, wheels upon which said base is mounted, sides projecting above said base, a shaft revolubly mounted in said sides at each end of said base and having an aperture therethrough, a pin adapted to pass through the aperture in each of said shafts and into the aperture in the base, parallel bars projecting from each of said shafts and adapted to be folded down between said sides when said pin is removed, and a figure revolubly hung from each of said parallel bars.

In testimony whereof I affix my signature.

FRANK L. DORSK.